(12) United States Patent
Belknap et al.

(10) Patent No.: US 7,716,589 B2
(45) Date of Patent: May 11, 2010

(54) NON-COMPUTER INTERFACE TO A DATABASE AND DIGITAL LIBRARY

(75) Inventors: William Russell Belknap, San Jose, CA (US); Steven Victor Kauffmann, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1998 days.

(21) Appl. No.: 10/247,613

(22) Filed: Sep. 20, 2002

(65) Prior Publication Data

US 2003/0090511 A1    May 15, 2003

Related U.S. Application Data

(63) Continuation of application No. 09/182,879, filed on Oct. 30, 1998, now Pat. No. 6,489,979.

(51) Int. Cl.
G06F 3/00 (2006.01)
G06F 9/00 (2006.01)
G06F 17/00 (2006.01)

(52) U.S. Cl. ...................... 715/738; 715/733
(58) Field of Classification Search ................. 715/738, 715/733
See application file for complete search history.

(56) References Cited

U.S. PATENT DOCUMENTS 4,860,123 A    8/1989    McCalley et al.
4,905,094 A    2/1990    Pocock et al.

(Continued)

OTHER PUBLICATIONS

C.H. Becker, "Cyberspace Navigation Techniques," *IBM Technical Disclosure Bulletin*, vol. 37, No. 08, Aug. 1994, pp. 595-596.

(Continued)

*Primary Examiner*—Kieu Vu
*Assistant Examiner*—Sabrina L. Greene
(74) *Attorney, Agent, or Firm*—Sughrue Mion, PLLC

(57) ABSTRACT

A non-computer interface to a storage system includes a set top box (STB) or interface unit connected to a storage system for storing information to be accessed by a user. The storage system can be a database, such as a relational database having a plurality of tables, or a digital library system, for storing information to be accessed by the user. Also stored in the storage system are navigation information or rules for controlling a user's navigation of the database. A user interacts with the storage system through the STB, sending navigation commands to the storage system via the STB. The navigation commands available to a user are generated by combining the navigation rules with the user's access privileges. The user can send navigation commands via a remote controller which sends cursor control commands to the STB. Alternatively, the user can send navigation commands via a virtual reality interface.

26 Claims, 10 Drawing Sheets

U.S. PATENT DOCUMENTS

| | | |
|---|---|---|
| 5,442,456 A | 8/1995 | Hansen |
| 5,479,268 A | 12/1995 | Young et al. |
| 5,546,529 A | 8/1996 | Bowers et al. |
| 5,572,650 A | 11/1996 | Antis et al. |
| 5,638,523 A | 6/1997 | Mullet et al. |
| 5,649,185 A | 7/1997 | Antognini et al. |
| 5,857,203 A | 1/1999 | Kauffman et al. |
| 6,023,267 A | 2/2000 | Chapuis et al. |
| 6,069,623 A | 5/2000 | Brooks |
| 6,078,920 A | 6/2000 | Tan et al. |
| 6,100,884 A | 8/2000 | Tomita et al. |
| 6,115,035 A | 9/2000 | Compton et al. |

OTHER PUBLICATIONS

L. Burns, A. Malhotra, "Browsing: A Novel Facility for Exploring the Contents of a Datastore," *IBM Technical Disclosure Bulletin*, vol. 33, No. 7, Dec. 1990, pp. 177-180.

L.L. Post, J.J. Sydir, "Dynamically Configurable User Interface for the Manipulation of Data Objects," *IBM Technical Disclosure Bulletin*, vol. 37, No. 03, Mar. 1994, pp. 23-30.

(Level 1: Field Sales Person selects Product B)

(Level 2: Product B Information For Field Sales Person Displayed)

(Level 1: Production Manager selects Prod_B)

(Level 2: Production Manager selects Specs)

(Level 3: Product B Specifications for Production Manager Displayed)

|  | PRODUCT B | | | |
|---|---|---|---|---|
| NAME | VENDOR | | | |
| xy | yy | Vendor | Specs | Stockroom |

(Level 2: Production Manager selects Stockroom)

FIG. 6D

| PRODUCT B STOCKROOM INFORMATION | | |
|---|---|---|
| U/M | INVENTORY | SHELF |
| 1 | 74 | 45A-2 |

(Level 3: Product B Stockroom Information for Production Manager Displayed)

FIG. 6E

NON-COMPUTER INTERFACE TO A DATABASE AND DIGITAL LIBRARY

This is a continuation of application Ser. No. 09/182,879 filed Oct. 30, 1998 now U.S. Pat. No. 6,489,979, the disclosure of which is incorporated herein by reference.

BACKGROUND OF THE INVENTION

1. Field of the Invention

The present invention relates to information processing systems, and more specifically to storage management systems and interfaces to such storage management systems.

2. Description of the Related Art

Conventional storage systems employ a database management system (dbms) for storing information in a database and for searching for and retrieving that stored information. Databases can be either hierarchical or relational, with relational databases often storing information in a plurality of database tables. Dbms's generally provide mechanisms for a user to interact with the database. For example, a database view is a static definition of specific portions of the database that are made visible to a user. For example, in a relational database having many tables, each of which is comprised of a plurality of rows and columns, a view of that database may be a predefined, static definition of only certain columns of certain tables of the database. Accordingly, when using that view of the database a user would only be given access to, or "see", the portions of the database defined in a view. In order to view the database a user would have to execute a database query that returns results based on a specified view. Both constructing the database query and interpreting the results of the query returned according to the view can often be complicated and can be difficult tasks to be performed by users unfamiliar with database interfaces.

Another information storage system is a digital library as described in U.S. Pat. No. 5,649,185 to Antognini et al., which is incorporated herein by reference. A digital library uses a database, file systems and other storage mechanisms, but also allows application programs, residing on a library client, to interact with the underlying digital library services and hence the underlying database, to store and retrieve information. However, the digital library application programs also require a computer end-user interface, requiring a user to use a computer monitor, keyboard and/or mouse to interact with the application program. Furthermore, the application programs require predetermined queries and views to locate and access data within the digital library. However, those predetermined queries and views often do not take advantage of the structure of the data stored within the database.

Potential database and digital library users in many industries and educational establishments desire avoiding computer interfaces for their applications, such as viewing rough video cuts and video production dailies as well as still images from graphics and art departments. To facilitate this access, yet modernize their applications to allow digital storage and distribution, users untrained in the computer arts need methods to access information different from conventional computer interface methods.

The simplest, most commonly accepted interface outside of the computer industry is that of a television with a remote controller, with the remote controller capable of entering numeric data, numerically selecting from simple menus, and simple navigational controls. If properly integrated and supported within a database, either (relational or hierarchial), or a digital library system, a VCR-like menu interface can provide sufficient function to implement most of the object search, selection, and viewing applications required by this user subset.

A product called "WEB TV" has been introduced which employs a set top box (STB) and a remote controller to control a conventional television set to display so called "web pages" of Internet "World Wide Web" (WWW) sites. The STB provides an interface to the WWW and controls the television set to display web pages and control menus. The STB also responds to commands received from the remote control in order to navigate the WWW. Typically the remote controller transmits an infrared (IR) signal to the STB. However, the WEB TV system provides only a limited function of navigating the WWW, and does not provide access to other information that may be stored in databases or digital library systems not accessible by the WWW.

SUMMARY OF THE INVENTION

To enable digital library and database installation, acceptance, and replication, it is important to offer a very simple non-computer interface that provides a reasonable level of function, but still maintains full access, security and control over the users' data.

An object of the invention is to provide an interface to a database or a digital library system that is more intuitive to users untrained in the computer arts than using a conventional computer interface.

Another object of the invention is to provide a database or digital library system that can be navigated dynamically based on its structure and a user's access privileges.

An important aspect of the invention involves providing context sensitive navigational methods, which are made possible by embedding the necessary control information, or in other words 'roadmap' information, into the database or data hierarchy. This 'roadmap' information, combined with user specific access and control information is used as input into a rule-based logic system that generates dynamic navigational commands for controlling the database or digital library.

To achieve the objects of the invention there is provided an apparatus providing an interface for browsing a storage unit, including a control unit for generating and transmitting a selection signal and an interface unit for connection to the storage unit. The interface unit receives a signal from the storage unit indicating a plurality of selection items and presents the selection items. Then, the control unit generates the selection signal to select one of the plurality of presented selection items, and the interface unit receives the selection signal and transmits a signal for controlling the storage unit to access an area of the storage unit indicated by the selection signal. The control unit includes a remote controller having one or more controls for selecting one of the presented selections. The remote controller includes directional keys for controlling movement of a cursor displayed on the display monitor, wherein the cursor position changes on the display monitor in response to operation of the directional keys; and a selection key for indicating selection of one of the presented selections items displayed closest to the location of the cursor.

To also achieve the objects of the invention, there is provided a method of controlling a storage unit, including presenting first navigation information from a first portion of the storage unit; sending a navigation command to the storage unit conforming to the presented first navigation information to access a second portion of the storage unit; and receiving second navigation information from the storage unit. The first and second navigation information are based on the first and second accessed portions of the storage unit, respectively, and an access privilege of a user. The method further includes transmitting information regarding the user requesting access to the storage unit prior to presenting the first navigation information, wherein the received first navigation information includes only navigation information resulting from comparing the transmitted user information with an object embedded in the storage unit, the embedded object containing the first navigation information. The sending of the navigation command is based on selection of a directional control, the directional control indicating a direction of navigating the storage unit, wherein the storage unit can be either a database or digital library.

The invention is still further directed to a computer program product including computer readable program code for performing the method discussed above.

BRIEF DESCRIPTION OF THE DRAWINGS

The above objects and advantages of the present invention will become more apparent by describing in detail preferred embodiments thereof with reference to the attached drawings in which:

FIGS. 6A-6E show further examples of navigation menus presented to a different class of user according to the invention shown in FIG. 4;

DETAILED DESCRIPTION OF THE INVENTION

A preferred embodiment of a non-computer interface to a database or digital library according to the present invention is described below in detail with reference to the accompanying drawings.

Structure of a Storage Unit Browser

Figure 1:
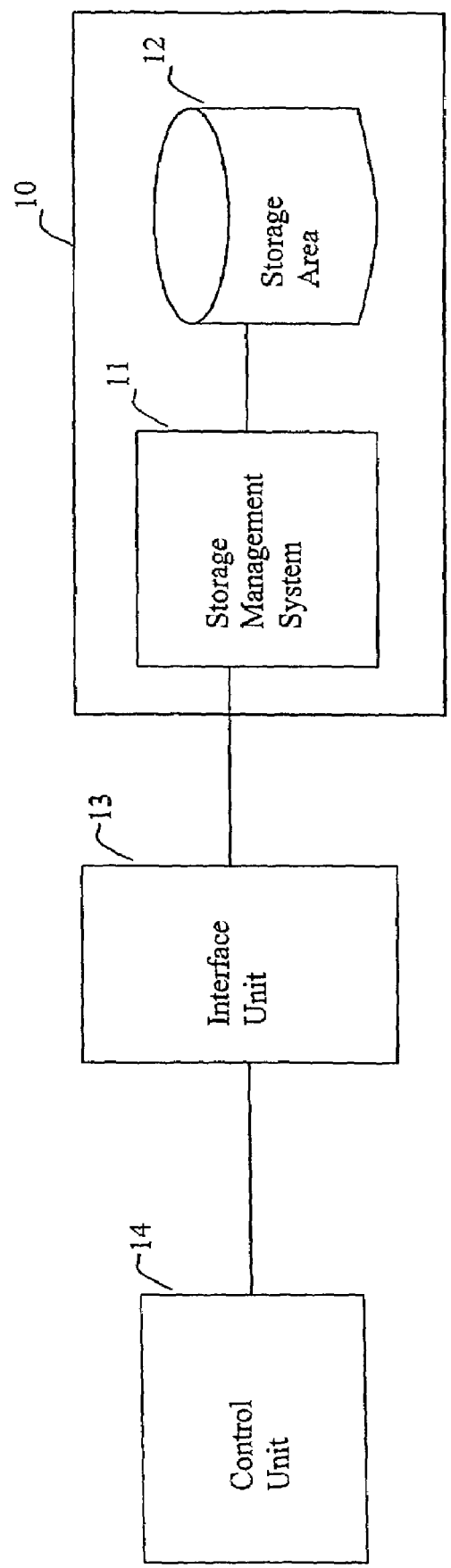
FIG. 1 is a block diagram illustrating a configuration of the invention.

The present invention is described below with reference to FIGS. 1 and 2. As shown in FIG. 1, a storage unit 10 includes a storage management system 11 which has a storage area 12, for which it provides storage management services. The storage area 12 stores information of interest to users, as in a conventional information storage system. An example of a storage unit 10 is a conventional database management system (either hierarchical or relational). Alternatively, the storage unit 10 can be a digital library as described by Antognini et al.

Connected to the storage unit 10 is an interface unit 13. The interface unit 13 functions to control interaction with the storage management system 11. For example, when the storage unit 10 is a database, which may have a plurality of database tables, the interface unit 13 generates commands and queries to navigate through and search for information stored in the database. The interface unit 13 is also connected to a control unit 14. The control unit 14 provides a mechanism for an end-user to interact with the storage unit 10 via the interface unit 13. The control unit 14 provides an intuitive interface for controlling the storage unit 10 to navigate through the storage area 12. Preferably the control unit 14 includes a device for presenting navigation controls to the user and a device for the user to select and operate such controls. For example, the control unit 14 may include a television monitor to display the navigation controls, as well as to display information stored in the storage area, and it may include a hand-held remote controller having directional controls to communicate navigation commands to the interface unit 13. The hand-held remote controller is connected to the interface unit 13 via a wireless connection, such as an infrared (IR) link. Alternatively, the control unit 14 may be a more complex virtual reality device to display information stored in the storage area in a virtual reality manner and to allow the user to control navigation through the storage area in a virtual reality manner using conventional virtual reality controls. Other examples of the control unit include, but are not limited to, a touchscreen, joystick, mouse, keypad, trackball, or other devices capable of indicating directional controls.

Figure 2A:
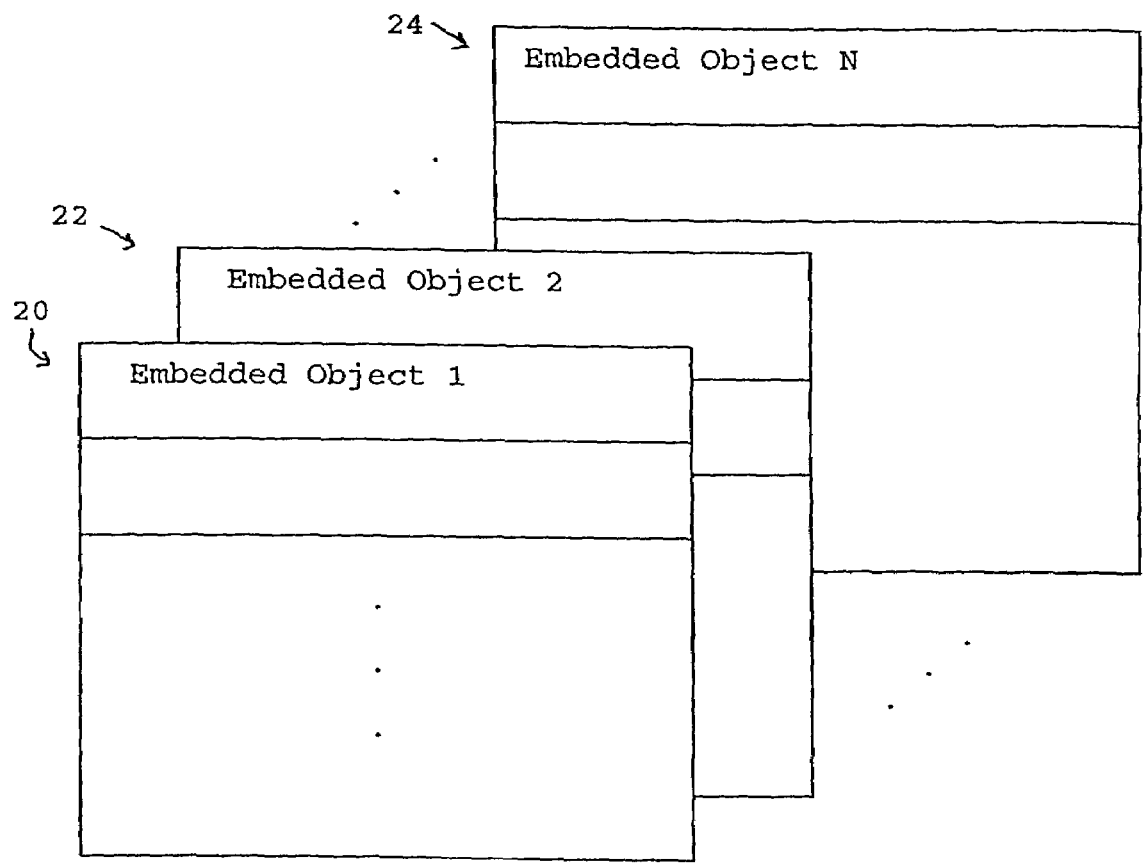
FIGS. 2A and 2B each show an embodiment of the invention for storing in a storage area of a storage system embedded objects used for navigating the storage system.

In order to enable dynamic browsing of the storage unit 10, special information is stored in the storage area 12 to assist a user in navigating through the information stored in storage area 12. That special information is referred to here as an embedded object. An embedded object can be mere data or it can be an object-oriented object. The embedded object includes information relating to the structure of the storage unit 10. An embedded object for each level of the database can be embedded, or stored in each table of the database, as shown in FIG. 2A. In this example the navigation information and methods that relate to navigating the first level of the database (Level 1) are stored in embedded object 1 in the level 1 table 20. Similarly, embedded object 2 is stored in the level 2 table 22 and embedded object n is stored in level n table 24.

Figure 2B:
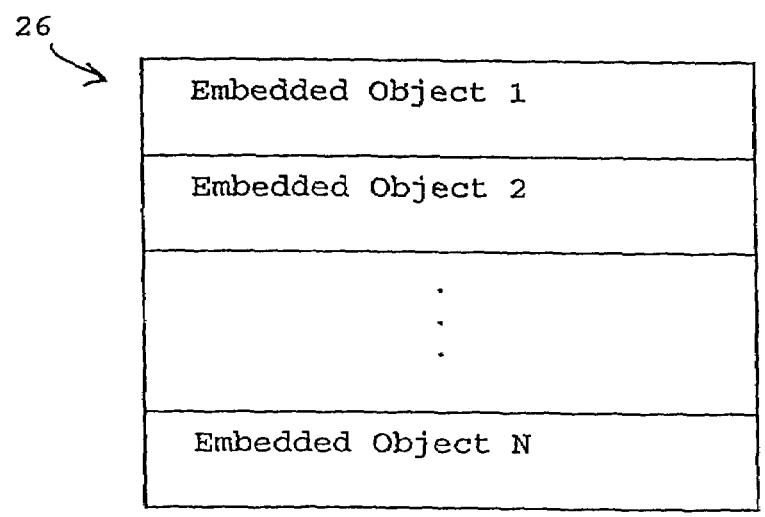

Alternatively, all the embedded objects can be stored in a table separate from the tables containing the information of interest, as shown in FIG. 2B. Here, embedded objects 1 through n are all stored in an embedded object table 26 as shown in FIG. 2B. Other alternative arrangements can be used so long as the embedded object for the level of interest can be accessed when the corresponding storage level is to be accessed. For example, the embedded objects can be stored in a separate database or even in a user's profile.

Embedded Objects

The embedded objects provide the information and methods necessary to enable a user to dynamically browse the storage unit 10 without being limited by predefined, static views of the storage unit. An embedded object contains information describing the structure of the storage unit which can be used to assist in navigating through the information held in the storage unit. This information is referred to as navigation data. An example of navigation data is simply data describing the columns in a database table, including the size of the columns, the type of data stored in those columns and the column names. The navigation data, however, is not limited to such basic structural information.

The embedded objects can contain certain basic object access methods which provide the necessary support, with a few enhancements, to embed navigation and view menus, selection menus, and operational program code (e.g., Java programming language applications known as "Java applets") within the data structures to be accessed and navigated (e.g., databases and digital libraries). This embedded control, view and navigational information, when supported natively by a digital library or database, combined with a remote control and view interface, becomes a self-defining library system that is easily navigated even by end-users unfamiliar with conventional computing system end-user interfaces.

Also, system administration utilities allow customized user access and predefined user views and searches to further simplify and optimize the access to and navigation of the database or digital library, to locate the specific information the user desires (and had authorization) to access or view. Embedded Java applets can support transitions to new areas, opening up new views of the database or digital library as a user traverses 'intersections' in the database or digital library. Such applets can minimize the volume of data visible, simplifying the user's view and avoiding overly complex displays, thereby allowing the user to focus on his/her specific needs.

Navigation

Figure 3:
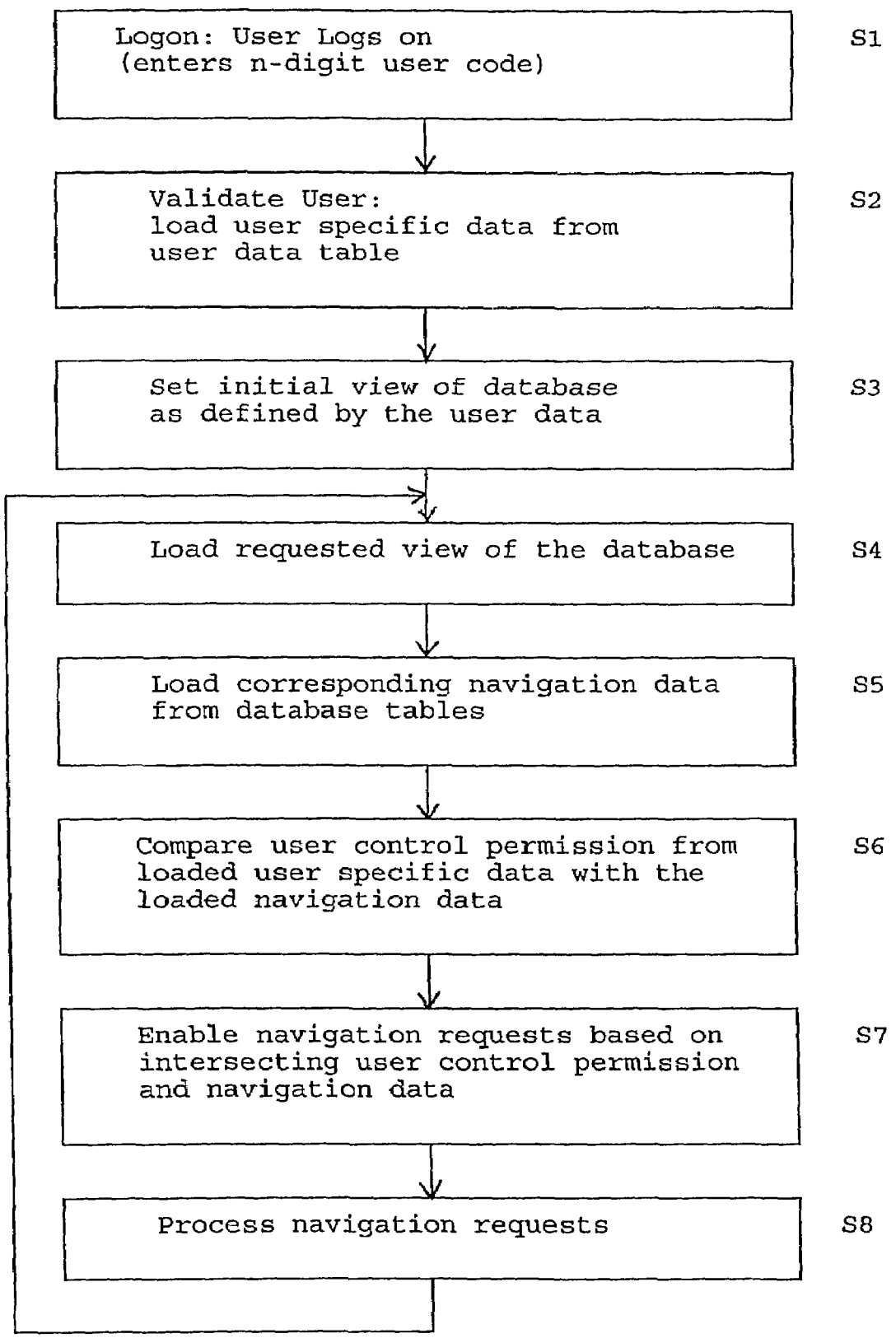
FIG. 3 shows a method of navigating a database according to the present invention.

The invention provides users with a more intuitive manner to navigate the storage unit 10 by making use of the embedded objects stored within the storage area 12. FIG. 3 illustrates, in flowchart from, a method for navigating the storage unit for the case where it is a database. Navigating other types of storage units would occur in a similar manner.

The navigation operation begins by a user logging onto the database (S1). For example, a user would enter an n-digit user code via the control unit 14 indicating the user's identity. The storage management system 11 validates the user's identity, determines whether the user is allowed access to the database, and loads user specific data from a user data table within the storage unit 10 (S2) or even from another data store.

Assuming the user is allowed access to the database, an initial view of the database is set via the interface unit 13 and control unit 14 based on the loaded user data (S3). The interface unit 13 sends a request to load the initial view to the storage unit 10, and accordingly, it is loaded (S4). Upon receiving the request, the storage management system 11 responds by loading navigation data from the database tables corresponding to the requested view (S5).

The user's permissions, from the user specific data loaded in S2, is compared with the loaded navigation data to determine navigation requests the user is authorized to make (S6). The comparison is preferably made in the storage management unit 10, for security reasons. However, alternatively, the interface unit can make the comparison if it retrieves both the user specific data and the navigation data from the embedded objects.

Once the navigation requests available to the user are determined based on the comparison performed in S6, the storage unit 10 sends a signal to the interface unit 13 indicating the navigation requests available to the user. The interface unit 13 then sends a signal to the control unit to present the available navigation requests to the user (S7). For example, the control unit may contain a television monitor and the interface unit 13 causes the television monitor to display a menu showing the available navigation requests as selectable menu items.

Having the navigation requests presented, the user, using the control unit controls, selects one of the navigation requests presented and sends to the interface unit 13 one or more signals indicating the selection. The interface unit 13 processes the selected navigation request by transforming it into a command recognized by the storage unit 10 (S8).

If the selected request is to navigate further into the database, S4 through S8 are repeated thereby facilitating the user's navigation of the data structures stored within the storage area 12. Otherwise, conventional processing is performed.

VCR Type Control Unit

Figure 4:
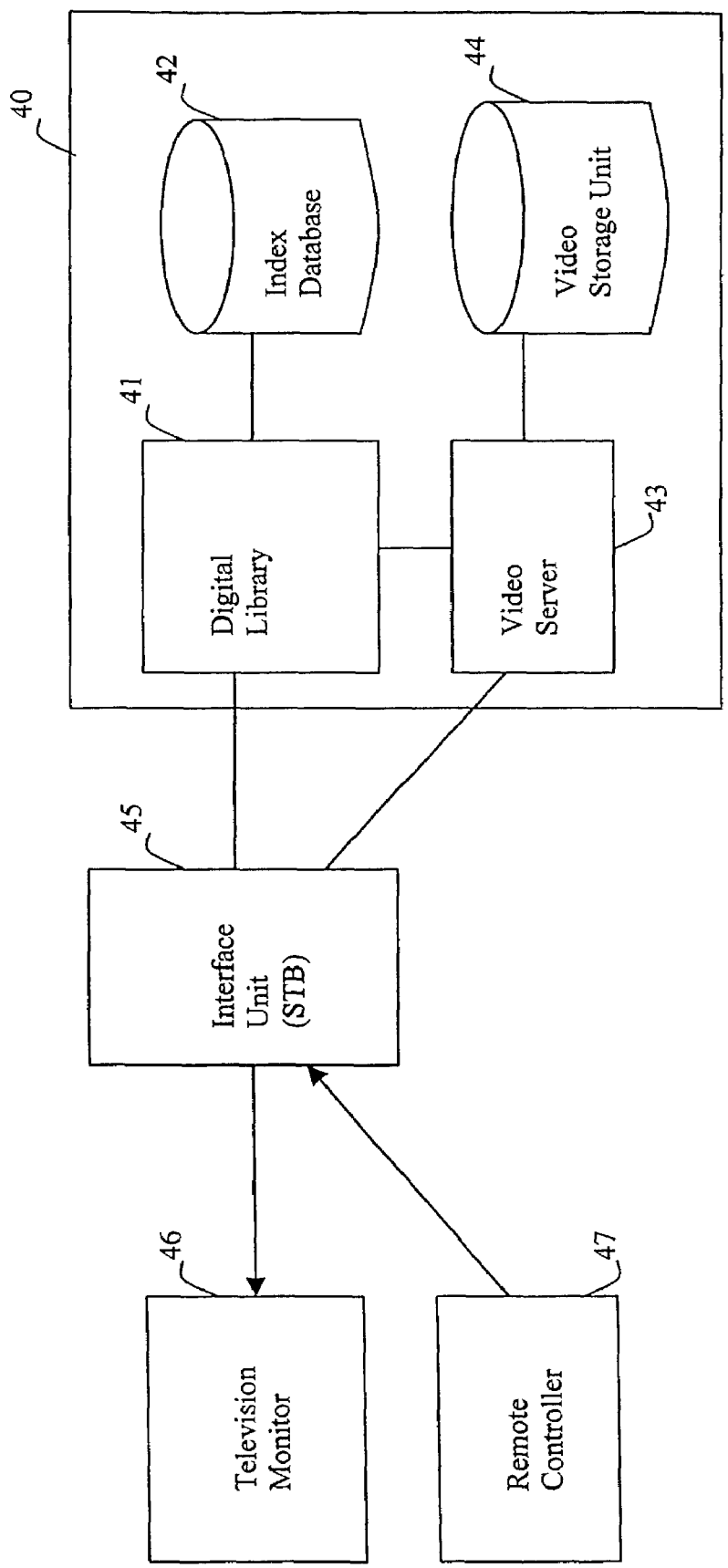
FIG. 4 shows an embodiment of the invention using a VCR type remote controller to control navigation through the storage system.

The non-computer interface of the present invention emulates conventional videocassette recorder (VCR) controls and provides context sensitive navigation through large, complex data structures and hierarchies. To achieve an interface resembling conventional VCR controls, the control unit 14, shown in FIG. 1, can include a television (TV) monitor and a remote controller capable of allowing a user to enter numeric data, numerically select from simple menus, and enter simple navigational controls. As shown in FIG. 4, these conventional components are integrated and supported within a storage system 40, such as a database (relational or hierarchical) or digital library system, to provide a VCR interface, via interface unit 45, to the storage system 40. This VCR-like menu interface provides sufficient function to implement most of the object search, selection, and viewing applications required by end-users familiar with conventional TV/VCR operation, but unfamiliar or unwilling to become familiar with conventional database end-user interfaces.

While the preferred embodiment is described in terms of a VCR-like control unit, it will be understood that the invention is not limited to such an embodiment and can be embodied with other navigation devices.

A. Hardware Configuration

The invention employs an interface unit 45 that operates somewhat like a well-known set top box (STB) used for cable television applications, but is modified to control a database or digital library 40. An embodiment of the interface unit or STB 45 includes an infrared receiver for receiving an infrared signal from a remote controller 47. The STB 45 is connected to a storage system 40 such as a database, or in this embodiment, a digital library 41. The storage system 40 stores the information to be accessed by a user. A multimedia server, such as a video server 43, can be included as part of the storage system 40, as shown in FIG. 4, to provide access to video data stored in a video storage unit 44. The video server 43 is controlled by the digital library 41. The STB 45 is also connected to a display monitor, such as a conventional television monitor 46, for displaying information to a user. The STB is also connected to a remote controller 47 for selecting navigation paths through the storage unit 40.

The remote controller 47 used here is a conventional remote controller familiar to any television user. An important feature of the invention is to provide a familiar interface to a user for accessing information in the storage system 40. Accordingly, the remote controller 47 provides simple and familiar navigation controls for the user to control navigation through the storage system 40. Preferably, the remote controller 47 has directional keys, such as keys indicating a movement direction (i.e., up, down, left and right). The remote controller also includes a selection key, preferably labeled "ENTER", or the like, to provided the user with a mechanism to signal the user's desire to select a specific menu item displayed on the television monitor 46. Preferably the remote controller 47 also contains numeric keys for the user to indicate a number.

The remote controller 47 is coupled to the STB 45 by use of infrared signals. However, other means of conveying a signal to the STB 45 can be used, such as a remote controller connected by wire to the STB.

Preferably the STB 45 includes a microprocessor, such one of the well-known 808x-type microprocessors, which runs an operating system. Also included in the STB is a motion picture expert's group (MPEG) decoder for decoding information according to an MPEG standard. The STB preferably supports object-oriented, platform independent programs, such as programs written in the Java programming language. Furthermore, the STB preferably provides support for downloadable plugins or filters, allowing the data-type-appropriate coder/decoder (codec) or applet to be downloaded and stored.

B. Navigation

In the embodiment shown in FIG. 4, a user navigates through the storage system 40 (e.g., a database or digital library) based on cursor type commands. In other words, the storage system 40 is navigated based on a user controlling movement of a cursor displayed on the monitor 46 to select one of a plurality of menu items. The user selects a menu item by controlling the cursor position with the directional keys on the remote controller 47, and selecting the menu item displayed closest to the cursor. Numeric, or even alpha-numeric keys on the remote controller 47 can be used to enter specific numeric or alpha-numeric information as necessary, such as when a user is prompted to do so.

The following is a description of an exemplary database in the system shown in FIG. 4, navigated by various types of users (each of a different class). It is noted that in this example an instance of a database is defined with many interrelated tables of data representing the items in a company warehouse. These include products, subsystems, components, publications, etc. Some entities or groups of entities within an organization have a great deal of associated data, such as technical specifications, part numbers, performance data, repair records, etc., while others only have a minimum amount of associated information, such as a publication which might only have associated with it title, page count, and order number information.

The present invention is illustrated through some examples of different types of users who would traverse a database. For ease of illustration a very simple database is represented in the following Tables 1-5. Although the example database is shown in five different tables, it could also be implemented using fewer tables (even a single table), or in more tables, as would be readily recognized by a skilled artisan. Following the database tables is an example User Table (Table 6), which describes attributes of the classes of uses defined for the examples.

Following Table 6 is example Navigation Data shown in Tables 7-11. The example Navigation Data can be data embedded within the database tables, or it can be held in one or more tables separate from the database tables, Tables 1-5. Following Tables 1-11 are examples of how different classes of users would navigate the example database using the present invention.

TABLE 1

Product_Table

| Product_ID | Name | Vendor | Specification_Table |
|---|---|---|---|
| A | xx | yy | Spec_Type_Alpha |
| B | xy | yy | Spec_Type_Alpha |
| C | yx | zz | Spec_Type_Beta |
| D | zz | zz | Spec_Type_Beta |
| E | zz | yy | Spec_Type_Beta |

TABLE 2

Specification Table_A

| Product_ID | Size | Weight | Material | Color |
|---|---|---|---|---|
| A | 2 | 17 | Steel | BGR |
| B | 1 | 12 | Plast | RBY |
| N | 4 | 3 | Titanium | BG |
| O | 6 | 45 | Lead | RB |

TABLE 3

Specification Table_B

| Product_ID | Size | Length | Width | Depth |
|---|---|---|---|---|
| D | 2 | 27 | 22 | 32 |
| E | 1 × 6 | 12 | 33 | 45 |
| P | 2 | 15 | 12 | 5 |
| Q | 1 | 17 | 16 | 7 |
| R | 4 | 34 | 18 | 10 |

TABLE 4

StockRoom_Table

| Product_ID | U/M | Inventory | Shelf |
|---|---|---|---|
| A | 1 | 213 | 17A-4 |
| B | 1 | 74 | 45A-2 |
| C | 1 | 13 | 7A-1 |
| D | 5 | 213 | 12B-3 |
| E | 2 | 21 | 15C-1 |

TABLE 5

Pricing_Table

| Product_ID | Lot Size | Price | Quantity Discount Code |
|---|---|---|---|
| A | 100 | 10 | x |
| B | 1 | 20 | y |
| C | 2 | 75 | x |
| D | 1 | 200 | x |
| E | 25 | 7 | y |

User Tables—Maps specific users to group access levels. These levels control either security or view access or both, depending on the implementation. The example user table shown below is a simple numerical level control of access/view. In this example, the user table would normally be replaced with more sophisticated security control mechanisms which are outside the scope of this invention, but which are known to skilled artisans.

TABLE 6

User Table

| Name | User_ID | Access Level | Password | Expiration |
|---|---|---|---|---|
| user1 | ABC | 219 | xxx | 19980912 |
| user2 | DEF | 260 | xxx | 19981011 |
| user3 | GHI | 310 | xxx | 19981012 |
| user4 | JKL | 100 | xxx | 19981231 |

In this example, user1 would be a sales manager; user2 a field sales person; user3 the company president; and user4 a production manager. Via the navigation fields, each will be presented a user interface at a level of complexity and with information appropriate to their uses, but without additional, unnecessary fields.

Navigational Tables—Provided by the table developer as either a private extension of each table (embedded tables), or as an auxiliary table paired with the data table. These tables define how a user or class of users navigate between tables, or at a field specific level within a table. Example Navigational Tables are shown below in Tables 7-11. In the example Navigation Tables below, the Access Level indicates a lower bound of a range of access levels that are associated with that specific row of information in the Navigation Table. The access levels applicable to a row in a Navigation Table extend from the specified access level up to the next higher specified access level in the table. For example, a user with an access level of 260 is given access to the third row shown in Table 7 below.

TABLE 7

Products Table (User/Navigation data extension)

| Access Level | Field1 | Field2 | Field3 | Field4 | Field5 |
|---|---|---|---|---|---|
| 100 | Prod_ID | Prod_Name | Vendor | Spec_table | Stockroom_table |
| 200 | Prod_ID | Prod_Name | Spec_table | Pricing_table | |
| 250 | Prod_ID | Prod_Name | Vendor | | |
| 300 | Prod_ID | Prod_Name | Vendor | | |

TABLE 8

Specification_table A (User/Navigation data extension)

| Access Level | Field1 | Field2 | Field3 | Field4 | Field5 |
|---|---|---|---|---|---|
| 100 | Prod_ID | Size | Weight | Material | Color |
| 200 | Prod_ID | Size | Weight | Color | |
| 250 | Prod_ID | Size | Weight | | |
| 300 | Prod_ID | Size | Color | | |

TABLE 9

Specification_table B (User/Navigation data extension)

| Access Level | Field1 | Field2 | Field3 | Field4 | Field5 |
|---|---|---|---|---|---|
| 100 | Prod_ID | Size | Length | Width | Depth |
| 200 | Prod_ID | Size | Length | Width | Depth |
| 250 | Prod_ID | Size | | | |
| 300 | Prod_ID | Size | | | |

TABLE 10

StockRoom_table (User/Navigation data extension)

| Access Level | Field1 | Field2 | Field3 | Field4 |
|---|---|---|---|---|
| 100 | Prod_ID | U/M | Inventory | Shelf |
| 200 | Prod_ID | U/M | Inventory | |
| 300 | Prod_ID | U/M | | |

TABLE 11

Pricing_table (User/Navigation data extension)

| Access Level | Field1 | Field2 | Field3 | Field4 |
|---|---|---|---|---|
| 100 | Prod_ID | Lot_Size | Price | Quantity_Discount_Code |
| 200 | Prod_ID | Price*discount (order_size) | | |
| 250 | Prod_ID | Lot_Size | Price | |
| 300 | Prod_ID | Price | | |

Note that a formula can be substituted for a specific value, for this example the price is calculated based on the order size and discount. This could be extended further to be a downloadable applet that would run in the context of the accessing user. This flexibility allows the data base designer to provide various levels of form (eg, user interface) and function based on the needs of the target users.

Also note that access levels can be defined differently for different Navigation Tables. In the Product Table (Table 7) users with access levels of 219 and 260 would have access to two different rows (i.e, the second and third rows, respectively). However, in the Stockroom Table (Table 10) those same two users would be given access to the same row (i.e. the second row in the table).

When a user browses through the database, according to the present invention, he or she is only able to 'see' limited views of the data and can only navigate into areas defined as accessible for that class of user (e.g., a field sales person). Other areas (e.g., repair records, performance test data, etc.) are not made visible to that class of user (i.e. a field sales person). The following are examples illustrate how two of the types of users noted above, a field sales person and a production manager, would navigate the database shown in Tables 1-5, according to the present invention. In these examples selection menu items are displayed to a user as the database is traversed using the VCR-type controls of the remote controller 47 (i.e., left/right arrows to move across tables, up/down to move into a table of up to the next higher level of abstraction). Each selection menu contains only items of interest to the specific type of user navigating the database.

Example of a Field Sales Person (User A) Navigating the Database

Figure 5A:
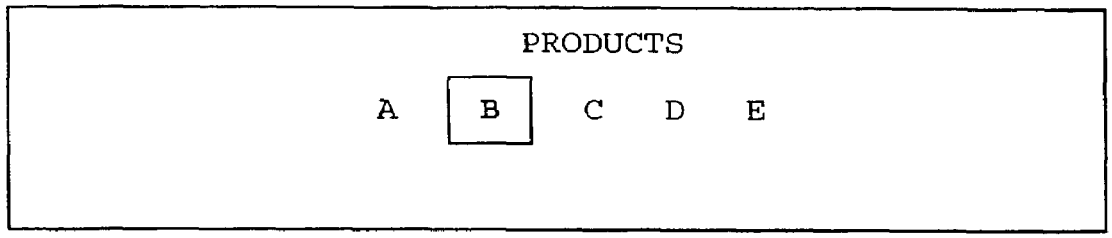
FIGS. 5A-5B show examples of navigation menus presented to a user according to the invention shown in FIG. 4.

Here, a field sales person, called here "User A," upon logging into the database, is presented with a list of selection options as shown in FIG. 5A. Here, the selection options are the various product IDs of the products in the company database.

The selection options are presented in response to the user logging into the database, and are based on that user's privileges and the structure of the database. Upon logging into the database, the STB sends to the database a user identifier and preferably a password. The database determines the user's privileges, with respect to the database, based on access control information held in the database, such as in the User Table. By combining the access control information for the user with information regarding the structure of the database, the selection options shown in FIG. 5A are determined and sent to STB 45 for display on television monitor 46.

In this example, selection options for four products are displayed; namely, products A, B, C and D. The database may contain information on other products in addition to A, B, C and D, however, selection options for only those products are displayed since User A's privileges allow access to information in the database for only those products.

Here, User A selects product B, as indicated in FIG. 5A by Product "B" being highlighted. In the preferred embodiment, User A uses the remote controller to make the selection. Preferably the remote controller has directional keys, i.e., up, down, left and right, to indicate movement of a cursor in a specific direction. For example, when the products available for access are displayed on a monitor, the user uses the left and/or right directional keys on the remote controller to control the movement of the cursor on the screen to move to a desired listed product. In this example User A depresses a right arrow key on the remote controller until Product "B" is highlighted as shown in FIG. 5A. Then, the user indicates that Product "B" is the desired product by depressing, preferably, another key on the remote controller such as an "ENTER" key to indicate the selection and thereby move to another level of the database.

Upon User A selecting Product "B", the database retrieves the navigation data for product B, and combines that data with User A's privileges. In this example, the User A's privileges are defined by the "Access Level" in the User Table, associated with User A, which is 260 in this example. Here, the Access Level for User A indicates that the user is a field sales person.

Figure 5B:
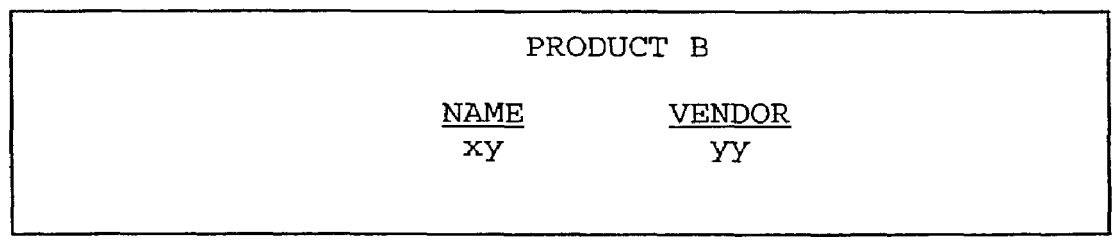

The data specifying the structure of the database, combined with User A's privileges, cause only two attributes for product B to be displayed to the user while at the second level (Level 2) of the database. This is because the field sales person has an access level of 260. The next lowest access level in the Product Table is 250. Accordingly, the third row in the Product Table is accessed for User A. Here, the two attributes for product B which are accessible to User A are the product's name (Prod_Name) and the vendor (Vendor). In this case there are no further selections to make, and the product name ("xy") and the vendor ("yy") are to be displayed to the user. Accordingly, a signal indicating those two attributes is sent from the database to the STB for display on the monitor, as shown in FIG. 5B.

In this example, the user does not see any other attributes of product B, such as specifications, price, or inventory information. However, another user, who is a sales manager, might see the same selectable items at Level 1, but would see additional or different attributes at Level 2, such as specification information (e.g., size, weight, color, etc.) and pricing information (e.g., lot size and quantity discount codes). An example of the information displayed from the same database, but for a different type of user (a production manager) is discussed next.

Example of a Production Manager (User B) Navigating the Database

Figure 6A:
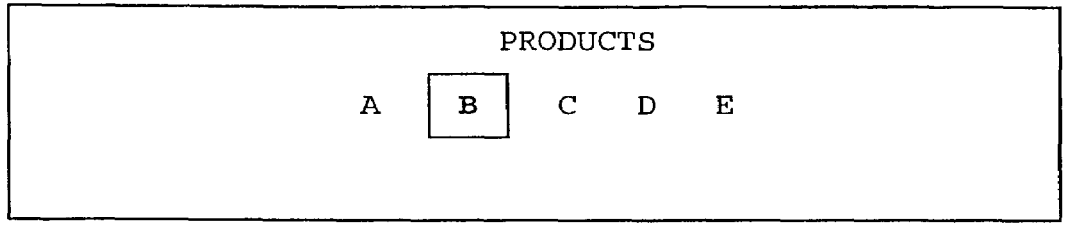

In this example a different type of user accesses the database, and because of his or her different access privileges sees a remarkably different set of information stored in the database, even though the database is navigated in a similar manner as in the previous example. Here, a production manager, called here "User B," upon logging into the database, is presented with a list of selection options as shown in FIG. 6A. As with User A, the selection options are the various product IDs of the products in the company database.

In this case, assuming User B, like User A, selects product B, a different set of information is display, compared to the information displayed for User A. Upon the user selecting product "B", by using the remote controller, the STB transmits a signal to the database indicating that product B is selected. Based on User B's access level, which was determined upon logging on in a manner similar to that described above for User A, the database consults the navigation data extension to the Products Table.

Figure 6B:
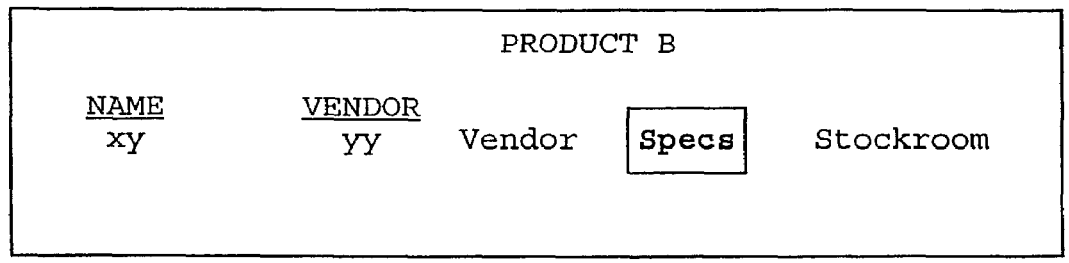

Here, the navigation data extension to the Products Table indicates that for a user with an access level of 100 (which is in the range of access levels for a Production Manager). Accordingly, User B is to be given access to the five fields of information shown in the Products Table. As a result, the database returns a signal indicating those five fields to the STB, and the STB causes those field names to be displayed as shown in FIG. 6B. Since the Product Name and Vendor fields have no further tables to be searched, the data recorded in the Product Table for those fields is sent from the database to the STB for display on the screen shown in FIG. 6B. However, the product specifications and stockroom items have further tables to consult to display that information. Accordingly, they are shown as selectable menu items. Here, User B selects "Specifications" to search for information about the specifications of product B.

Figure 6C:
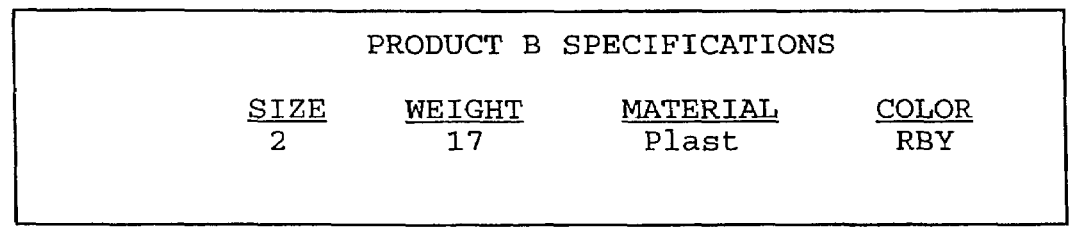

Since the Product Table specifies "Spec_Type_A" for product B, the database accesses that table to retrieve information relating to specification information about product B. The "Spec_Table_A" is accessed based on the user's access level. In this case, since User B is a production manager with an access level of "100", the "Spec_Table_A" table is accessed for Access Level 100, as shown above in Table 8. In this case four specification fields are to be displayed, in addition to the product ID. Those four specification fields are "Size", "Weight", "Material" and "Color". Accordingly, the database sends the STB a signal indicating that information, and the STB causes that information to be displayed, as shown in FIG. 6C.

Since there are no further levels of the database to traverse for specification information, User B can return to Level 2 of the database and select another selectable menu item. Here, for example, User B selects "Stockroom" for product B, as shown in FIG. 6D. The STB transmits a signal indicating the same to the database. The database, via the Navigation Data extensions to the Stockroom Table (as shown above in Table 11), sends a signal to the STB indicating that in addition to the Product ID, the Unit of Measure (U/M), Inventory, and Shelf items are to be accessible to User B. The STB may or may not display all that information, depending on how it is programmed. Assuming the STB is programmed to display all the fields the user has access to, the STB displays the information for those fields, as shown in FIG. 6E.

Note that in each of the above examples, the user would be unaware that most of the 'items' in the table were actually references to other tables. This simplification of the data representation is an important aspect of the invention, since it flattens the data model at each level of abstraction to present the simplest set of choices for the user to select, and only the choices that are defined to be selectable for that user.

While at a level of the database that references other portions of the database, the user can further navigate through the database by selecting one of the displayed selection items, in which only items the user has access to are displayed.

Accordingly, the present invention allows the user to navigate through the database in a very intuitive and familiar manner by allowing the user to command the database using a familiar remote control device and using only directional keys (e.g., arrow keys) and a signalling key (e.g., ENTER). Moreover, the user is provided access to only those portions of the database the user is authorized to access and which are present in the database.

In each of the above examples, and in general, the storage unit 40 combines the user data, such as the users' access level, with the information in the embedded objects for each level according to a set of rules, or in other words according to a rules definition object. The rule definitions determine how the navigational data and the user data are combined to control movement through the database or digital library. The rules can be basic boolean AND's and OR's, or more complex such as rules used in a knowledge based rules system. The corresponding logic will determine the actions available to a user at a specific level or location in the system, and will pass that control information out to the display system and control hardware. For the examples above, the only fields at Levels 1 and 2 that are selectable for User A are the intersections of both the Product Table and the User data, namely, the Product-Name field and Vendor field. Likewise, in the second example, the only fields at Levels 1, 2 and 3 that are selectable for User B are the intersections of the User Table with the Product, Specification and Pricing Tables. Accordingly the rule definition in these examples is simply a logical AND of User A's user data and the navigation data extensions.

C. Security

The invention employs security features to protect the information stored in the storage unit. Specifically, a numeric userid and password can be required to be entered. Conventional security programs are used to check the entered userid and password to verify that they are correct for User A.

Also, upon logging on, User A's home page is immediately launched, thereby presenting User A with his/her home page to begin entry into the system from a controlled location.

The invention can also employ template driven hierarchical menus to ensure that only predefined and authorized operations are performed. Further, the invention employs controlled access lists to restrict views and navigation in the storage unit.

D. Search Interface

The invention provides for pre-defined search keywords which are menu selectable, and per user or per object collection definitions, as indicated in FIGS. 5A and 5B, and 6A through 6E. Also, by providing the constrained access lists, inaccessible searches are avoided, thereby saving time and avoiding frustrating the user.

Mixed object searches are supported, and the invention can force a presearch to be performed to limit usage of resources for compute intensive searches.

Virtual Reality Type Control Unit

Figure 7:
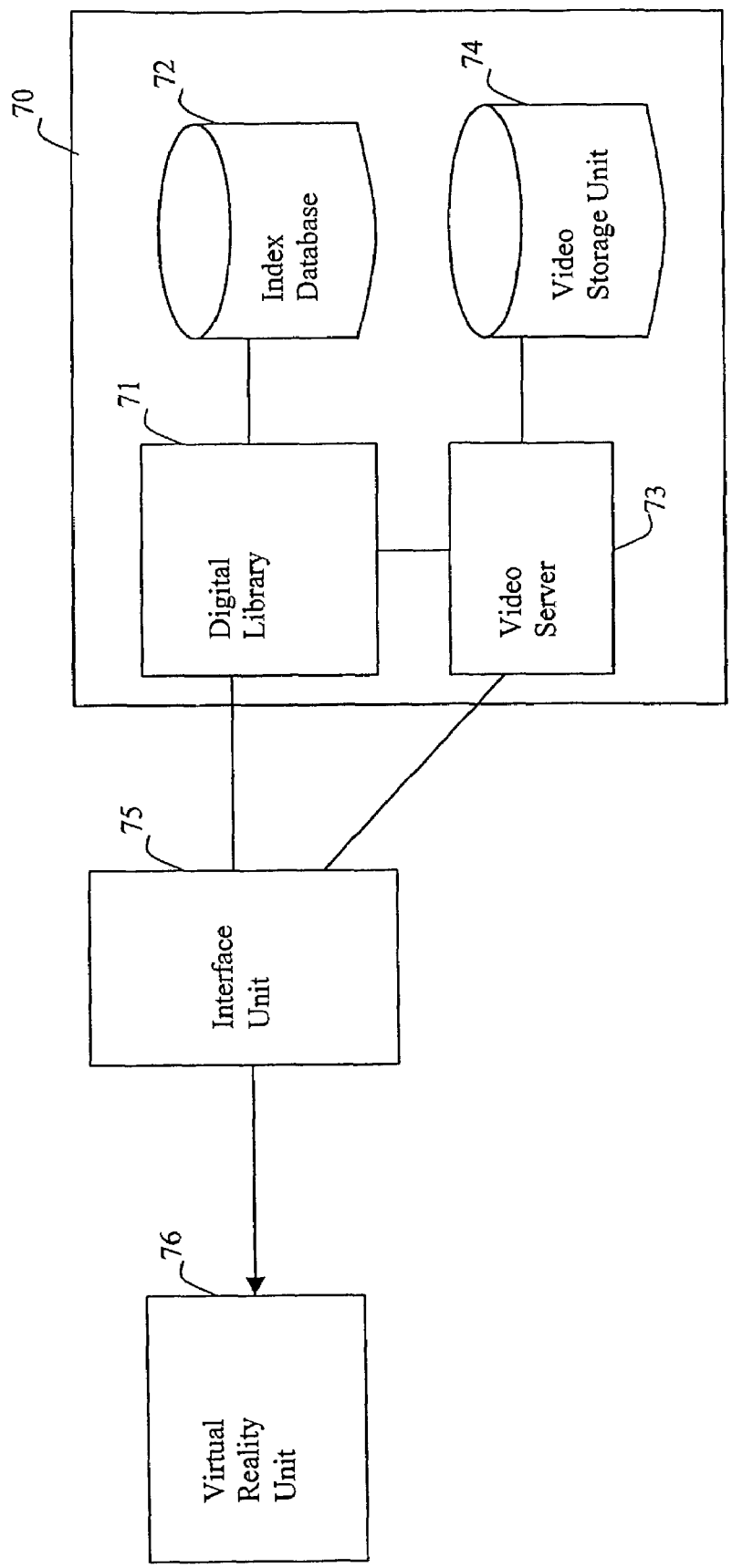
FIG. 7 shows another embodiment of the invention using a virtual reality type interface to control navigation through the storage system.

The present invention encompasses expanding the navigation method out to the latest technology with virtual reality and three-dimensional (3D) worlds, as shown in FIG. 7. Such a control unit allows digital libraries employing the invention to be browsed as virtual worlds much like a person would browse through the Smithsonian Institution's complex of buildings, halls, floors, aisles, shelves and exhibits. Here, in a storage system 70 housing information relating to the Smithsonian collections, the database, or digital library 71 can be structured according to the organization in the actual museums. For example, the insect collections can be grouped together in one part of the storage system, and further grouped by type of insect (e.g., butterflies, spiders, etc.).

Employing a virtual reality unit to browse the various portions of the digital library provides the capability for a user to virtually visit the Smithsonian museum without actually being there. When used in combination with a compound embedded object (described below), the storage system can include virtual reality programs that are loaded, when selected by the user and assuming the user has the appropriate access authorization, as the user traverses different parts of storage system.

For example, as the user enters the virtual museum a collection of buildings is presented. The user, via the virtual reality type control unit 76, enters one of the buildings, for example, the Smithsonian Institution's National Museum of Natural History. The virtual reality unit 76 causes the interface unit 75 to control the digital library to access the tables relating to the National Museum of Natural History. Upon accessing those tables the compound embedded objects for those tables are loaded. An example of such a compound embedded object is a Java applet that is sent via the interface unit 75 to the virtual reality unit 76. The Java applet may show a circular lobby area surrounded by doorways leading to rooms housing the various collections. The applet could retrieve a three-dimensional picture of a large bull elephant, such as the one present in the real Museum of Natural History.

Upon the user controlling the virtual reality unit 76 to walk through the doorway leading to the dinosaur exhibit, a signal is sent to the interface unit 75 to control digital library 71 to access the portion of the storage system 70 relating to information about the dinosaur exhibit. Again, the user data is compared with the embedded objects in that portion of the digital library, and the authorized portions of the embedded objects are sent via the interface unit 75 to the virtual reality unit 76. Here, the embedded object may be a list of the types of dinosaur skeletons present in the room. Upon a user virtually walking to the Allosaurus skeleton exhibit, another portion of the database is accessed and its embedded objects loaded. Here, the embedded object may contain a photograph of the skeleton along with facts and figures about an Allosaurus. It may also contain an application program, such as a Java applet, that causes a video clip to be retrieved from the video storage unit 74 via the video server 73. The video clip could be of an animated movie of an Allosaurus which is sent to the virtual reality unit 76 via the interface unit 75. The virtual reality unit 76 then plays the video clip superimposed over the Allosaurus skeleton, giving the appearance of the skeleton coming alive. The user is presented a variety of options which can be selected and executed in a similar manner. The user could continue browsing through the virtual museum with the virtual reality unit 76 by browsing through the digital library.

The capabilities described above are expected to open many new areas for sales and marketing since it allows non-computer literate persons access to a large amount of the information stored in a digital library or database. As shown in FIG. 7, the control unit is a virtual reality unit providing the user with a virtual reality interface to the system.

Alternative Embodiments

The first embodiment of the invention, discussed above, uses linear programming logic to compare data values and select from simple lists of options. Other embodiments expand on the first embodiment to take control data from embedded control tables in the database, and to build more complex layers of decision logic as appropriate. The first embodiment uses conventional programming logic such as case statements, boolean compares, and if-then-else clauses. However, the invention is not limited to such conventional programming logic. For example, an expert system or other artificial intelligence program can be used to implement the rule definitions and perform the comparison function. Also, while it is preferred for security purposes that the comparison is performed in the storage unit, the invention also embraces performing the comparison elsewhere, such as in the interface unit 47.

In a more general embodiment, the navigational data could be stored in the same database as the data to be viewed, another database used specifically for navigation, or even as a profile for the client. A system default, or a navigation profile per user role, or one per user, can be used to identify the location of the navigational data. Each level or table can have user profile information, so each user would override values only when needed. The system checks for the most specific profile first, then by role, then by default.

The navigational data is typically database table or level specific, at least specific to a data hierarchy or design of the table or level, whereas the user profile can represent a class of users (i.e., a role). The navigation data and user profile are dynamically combined by the control logic to yield user specific navigation controls for the current level, and methods for traversing to other 'authorized' levels.

A more sophisticated user interface can be used to navigate the storage system. For example a full, multidimensional (3D+) navigation interface can be connected to the interface unit to allow for a virtual reality view of the storage system. With such a virtual reality interface, using conventional virtual reality hardware and software connected to the interface unit, a user can traverse the digital library system's virtual buildings, halls, floors, aisles, shelves, etc. In this alternative embodiment VRML navigation objects are stored at database "intersections" within the storage system.

Compound Embedded Object

A compound embedded object is an embedded object that is more complex than the embedded objects described above and contains a heterogeneous mix of parts. It can be thought of as a "super object." Examples of compound embedded objects are objects that can support hidden control parts, such as views, Java applets, and templates. A compound embedded object can be stored at the database or digital library "intersections" to open new "views" to the storage system. Another example of a compound embedded object is a mini-database.

A local client, such as a library client, can get, move or traverse data at several levels. A compound object allows for logically hiding the details below the appropriate level based on the user profile. For example, compound embedded objects can provide equivalent relational access to a hierarchial storage model. Furthermore, compound objects can be nested to provide access at any level as a single blob. Also, multiple access links allow part or type specific searches in a digital library.

A compound object is comprised of heterogeneous objects, e.g., digital library parts, files and even databases, grouped together for purposes of access. A compound object can be used to easily handle the collection of components comprising the compound object. It can be passed to other users or viewed as a collection without taking it apart into its component parts.

Figure 8A:
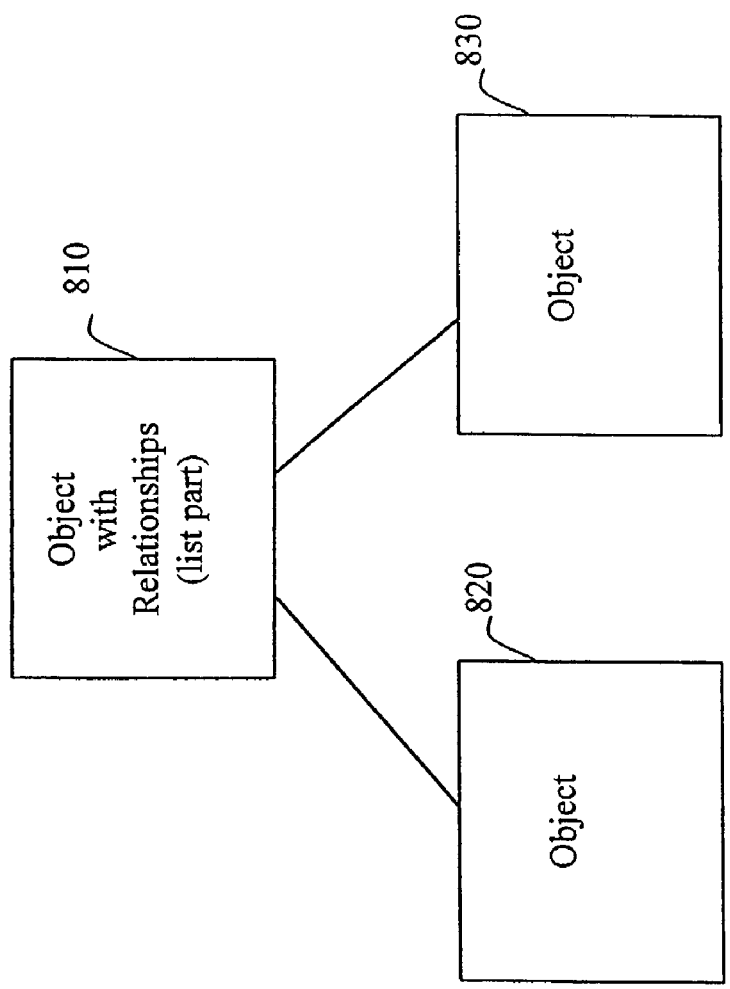
FIGS. 8A and 8B show embodiments of a compound object.

FIG. 8A illustrates a compound object. Here the compound object 800 includes an object 810 of relationships, such as a list of parts held 820 and 830. The part objects 820 and 830 are logically embedded in the compound object 800 and behave as attributes (i.e., values in a database table). The relationships held in object 810 are used like pointers to the other objects 820 and 830 comprising the compound object, in that they identify or name objects 820 and 830.

Figure 8B:
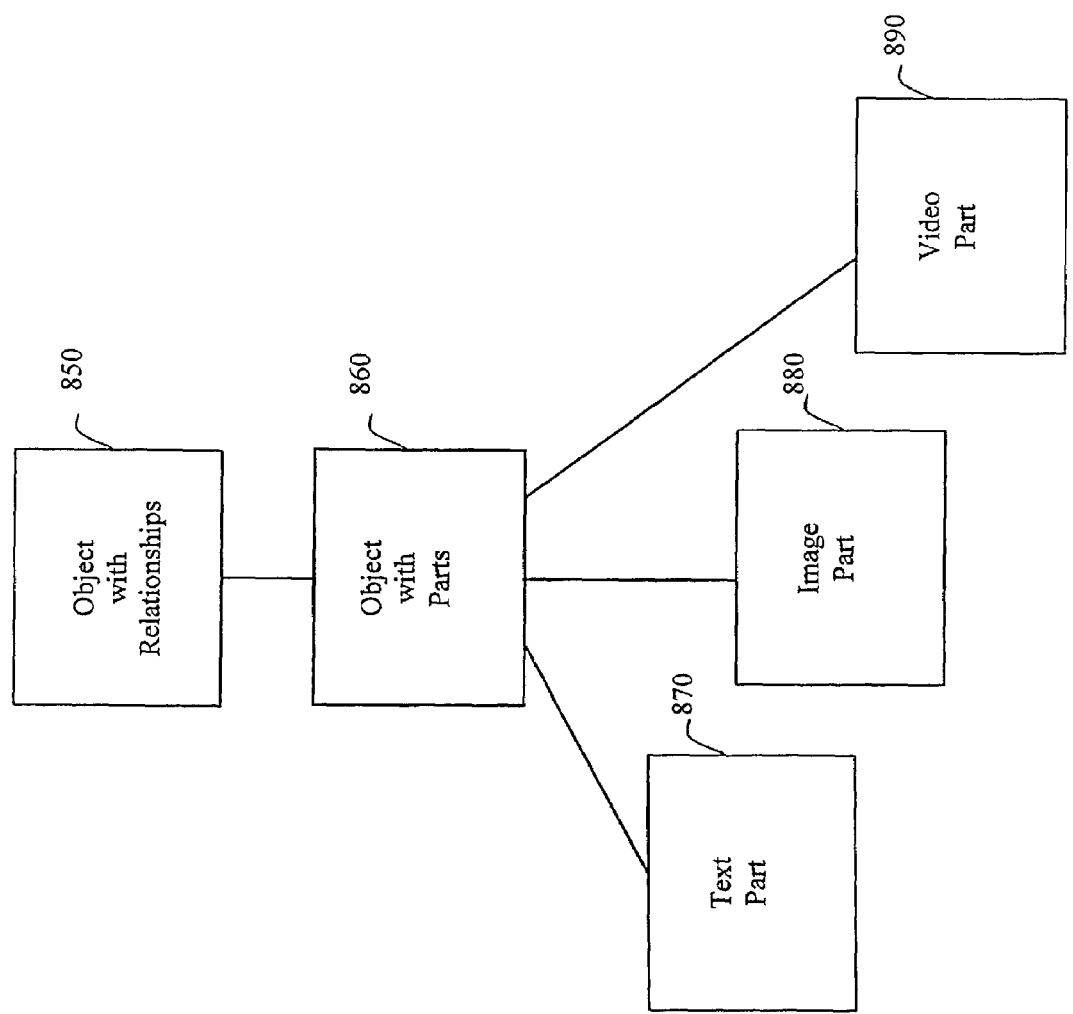

FIG. 8B shows another embodiment of a compound object. Here the compound object 840 represents a film scene in a movie. The film scene is made up of background cels, animation cels, images, video, text and audio. The film scene compound object 840 may have many layers of relationships, illustrated by objects 850 and 860, with objects 870, 880, and 890 residing at the lower levels of the compound object and containing the text, image and video parts, respectively. When a user, such as a movie director, wants to view the scene, the entire composite scene would typically be viewed rather than its constituent parts. By using compound object 840 to represent the scene, when the director browses the database or digital library, the compound object 840 is retrieved and displayed. However, by embedding the relationships in the higher level objects (i.e., objects 850 and 860) the director can access and view an individual part, such as a background cel. Moreover, the individual parts can be retrieved by other users for other purposes, such as an editor who must edit the background cel, or an illustrator who wants to copy the background cel, thereby allowing for reuse of the objects.

Navigation information can be contained in the objects or parts. It is noted that such information is different than a database view, because each instance of a compound object may have a unique navigation plan.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An apparatus providing an interface for browsing a storage unit, comprising:
   a control unit for generating and transmitting a selection signal; and
   an interface unit for connection to the storage unit,
   wherein the interface unit receives a signal from the storage unit indicating a plurality of selection items and presents the selection items, whereupon the control unit generates the selection signal to select one of the plurality of presented selection items, and the interface unit receives the selection signal and transmits a signal for controlling the storage unit to access an area of the storage unit indicated by the selection signal.

2. The apparatus according to claim 1, wherein the control unit comprises a remote controller having one or more controls for selecting one of the presented selections, and wherein the control unit presents the selection items on a display monitor.

3. The apparatus according to claim 1, wherein the control unit comprises a virtual reality control device for displaying the plurality of selection items in a virtual reality manner, and for selecting at least one of the selection items in a virtual reality manner.

4. The apparatus according to claim 1, wherein the storage unit is a digital library having stored therein a plurality of binary large objects (blobs).

5. The apparatus according to claim 1, wherein the storage unit is a database.

6. The apparatus according to claim 1, wherein a user depresses an object to generate and transmit said selection signal.

7. The apparatus according to claim 2, wherein the remote controller comprises:
  directional keys for controlling movement of a cursor displayed on the display monitor, wherein the cursor position changes on the display monitor in response to operation of the directional keys; and
  a selection key for indicating selection of one of the presented selections items displayed closest to the location of the cursor.

8. An arrangement for browsing stored information, comprising:
  a storage unit containing the stored information and navigation information for navigating the storage unit;
  an interface unit connected to the storage unit, for submitting navigation commands to the storage unit and receiving information from the storage unit in response the navigation commands;
  a remote controller having navigation controls, wherein the remote controller is wirelessly coupled to the interface unit and transmits a first navigation signal to the interface unit in response to selection of one or more of the navigation controls, and in response to receiving the first navigation signal the interface unit submits a first navigation command to the storage unit causing the storage unit to output the navigation information for further navigation of the storage unit.

9. The arrangement according to claim 8, wherein the storage unit is a digital library having stored therein a plurality of binary large objects (blobs).

10. The arrangement according to claim 8, wherein the storage unit is a database.

11. The arrangement according to claim 8, wherein the navigation controls are navigation keys.

12. The arrangement according to claim 8, wherein navigation information output from the storage unit includes navigation control information for controlling access to a portion of the storage unit.

13. The arrangement according to claim 8, wherein said selection of said one or more of the navigation controls is performed by a depression of an object.

14. The arrangement according to claim 11, wherein in response to selection of another of the navigation keys the remote controller transmits a second navigation signal to the interface unit thereby causing the interface unit to submit a second navigation command to the storage unit, wherein the second navigation command corresponds to the navigation control information thereby controlling the storage unit to provide access to a portion of the storage unit corresponding to the selection.

15. The arrangement according to claim 11, wherein the navigation keys of the remote controller include directional keys indicating directions, wherein the interface unit submits a command to the storage unit in response to selection of one of the directional keys if the navigation control information indicates that the direction of the corresponding directional key is enabled.

16. The arrangement according to claim 12, wherein the navigation control information output from the storage unit is based on a user's identity.

17. A method of controlling a storage unit, comprising:
  accessing a first portion of the storage unit;
  presenting first navigation information from the first portion of the storage unit;
  sending a navigation command to the storage unit relating to the presented first navigation information to access a second portion of the storage unit;
  receiving second navigation information from the storage unit, wherein the first and second navigation information are based on the first and second accessed portions of the storage unit, respectively, and an access privilege,
  wherein said first navigation information is used to navigate through at least said first portion of the storage unit.

18. The method according to claim 17, wherein said sending the navigation command is based on selection of a directional control, the directional control indicating a direction of navigating the storage unit.

19. The method according to claim 17, wherein said second navigation information is used to navigate through at least said second portion of the storage unit.

20. The method according to claim 17, wherein at least said first navigation information is an embedded object.

21. The method according to claim 18, wherein the storage unit is a database.

22. The method according to claim 18, wherein the storage unit is a digital library.

23. A computer program product for browsing information in a storage unit, the computer program product including a computer-readable medium, comprising:
  first computer-readable code for presenting first navigation information from an accessed first portion of the storage unit;
  second computer-readable code for sending a navigation command to the storage unit based on the displayed first navigation information to access a second portion of the storage unit; and
  third computer-readable code for receiving second navigation information from the storage unit, wherein the first and second navigation information are based on the first and second accessed portions of the storage unit, respectively, and an access privilege,
  wherein said first navigation information is used to navigate through at least said first portion of the storage unit.

24. The program product according to claim 23, wherein said sending of the navigation command is based on selection of a directional control, the directional control indicating a direction of navigating the storage unit.

25. The computer program product according to claim 23, wherein said second navigation information is used to navigate through at least said second portion of the storage unit.

26. The computer program product according to claim 23, wherein at least said first navigation information is an embedded object.

* * * * *